United States Patent Office 3,082,956
Patented Mar. 26, 1963

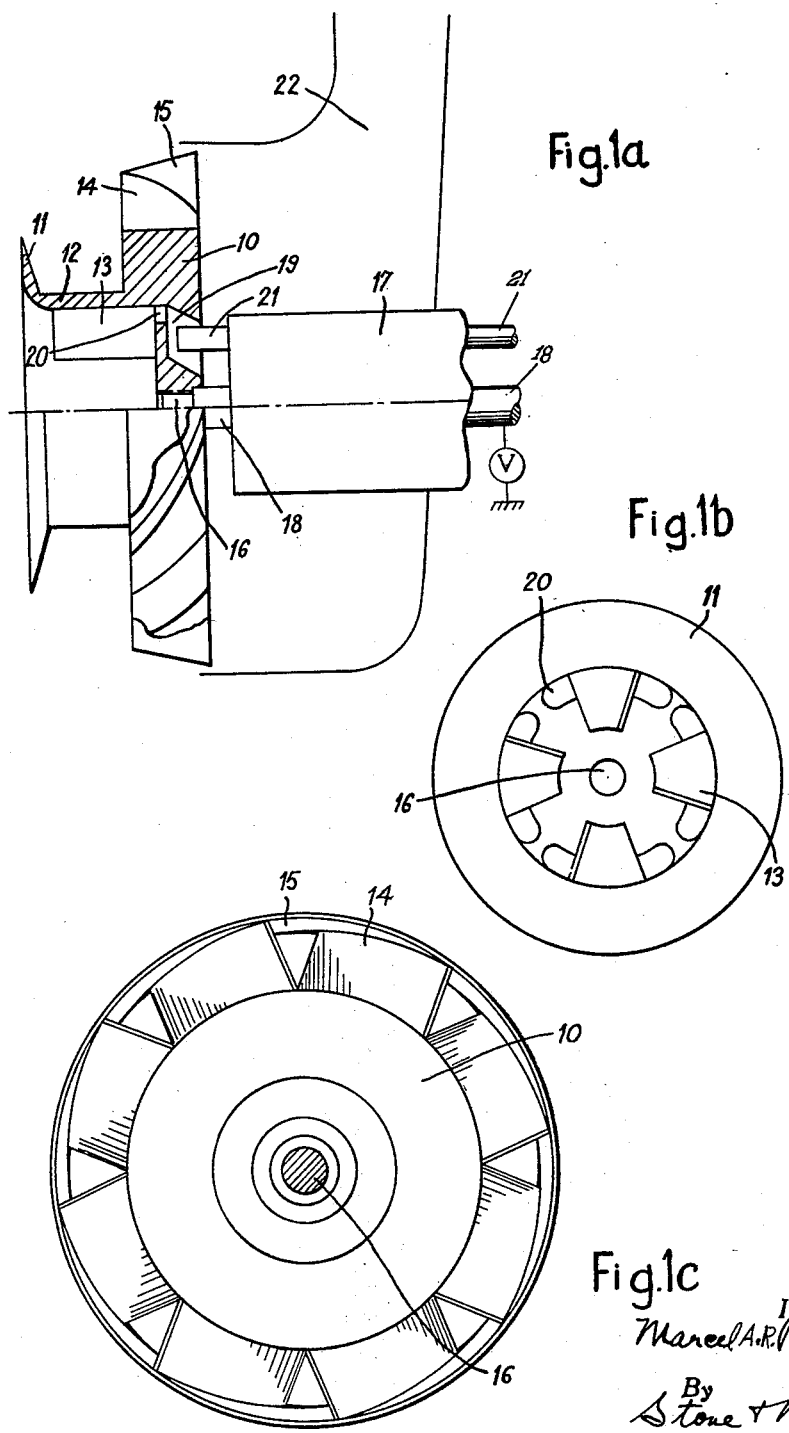

3,082,956
ELECTROSTATIC SPRAYING OR ATOMISING HEADS FOR LIQUIDS OR PULVERULENT SOLIDS
Marcel Auguste Roger Point, Grenoble, France, assignor to Societe Anonyme de Machines Electrostatiques, Grenoble, France, a body corporate of France
Filed Nov. 19, 1959, Ser. No. 854,068
Claims priority, application France Nov. 26, 1958
5 Claims. (Cl. 239—15)

The present invention relates to new constructions of electrostatic atomising or spraying heads.

According to the invention, a device is provided which enables the cloud of particles to be concentrated and avoids their dispersion. This is achieved by means of a flow of surrounding fluid which improves the efficiency in use by giving to these particles a slight supplementary speed component in the mean direction of the spray. The blowing effect of this fluid modifies the possible effects due to centrifugal force, resulting from the rotation of the spraying head, but without reducing the preponderant effect of the electrostatic field.

These remarkable results are obtained, according to a feature of the invention, by disposing a part provided with blades concentrical with the rotating member serving for dispersing the liquid or the pulverulent solid, the shape of these blades being such that this part will project into the zone of the spray a flow of air, or more generally of surrounding fluid, or even of a gas suitable for the effect to be obtained, said flow having an annular cylindrical or convergent or divergent conical shape, and being substantially coaxial with the axis of rotation of said dispersing member.

In addition to the advantages mentioned above, this enables the safety factor to be still further increased by preventing, if the medium to be dispersed is inflammable, the formation of any spark between the head and an object at a different potential placed in its vicinity, and also preventing a mass of inflammable compound from stagnating at one place.

When such a head is used in coating an object with a layer of fluid, in order to paint the object for example, penetration and adhesion are improved and the paint penetrates better into the cavities or orifices of the object to be painted. Moreover, a well-known phenomenon of electrostatic spraying is eliminated. Owing to the form of the head and owing to its rotation the substance to be sprayed is normally dispersed so as to form a cone which is coaxial to the head and in which there are few particles. Thus when painting on a plane perpendicular to the axis of rotation of the head, there is a circle centred on this axis which is not painted. This is usually referred to as "cone shadow phenomenon." It will be understood that the fluid flow created by the device of the invention enables a correction to be effected by giving the slight blowing of fluid required for this.

Lastly, the slight overpressure obtained enables the field to be increased in the zone of the head where the particles are cast into the surrounding fluid and where one will obviously endeavour to obtain a rather strong electrostatic field.

In order that the technical characteristics of the present invention may be better understood, three embodiments of it will now be described by way of non-limiting example, and with reference to the accompanying drawings in which:

FIGURES 1a to 1c show a disc-shaped head, FIGURE 1a being partially in section, FIGURE 1b a front elevation, and FIGURE 1c a rear elevation.

Figure 2A:
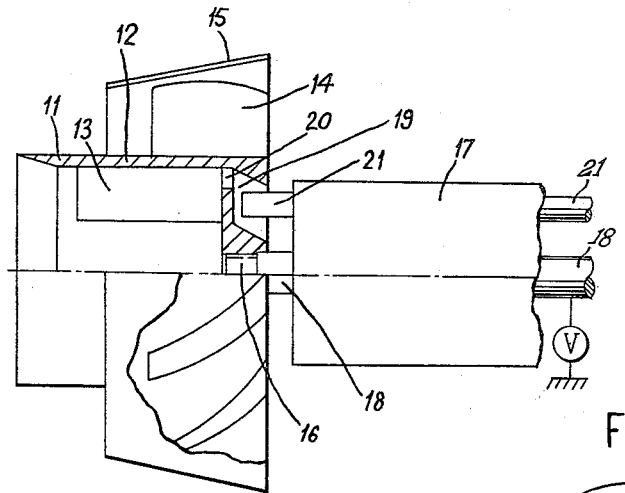
FIGURES 2a to 2c show a cylindrical head, FIGURE 2a being partially in section, FIGURE 2b being a front elevation, and FIGURE 2c being a rear elevation.

FIGURES 1a to 1c show a disc-shaped head. It consists of a body 10 having at its front part a disc-shaped flared part 11. The cylindrical part 12 is hollow and may be provided with internal blades 13. Moreover, external blades 14 are provided which may or may not be supported on an external ring 15. The head is fixed to the apparatus, which may for example be a gun having a barrel 17, only a part of which is shown, by means of a screw 16 or other device. This screw is carried by a shaft 18 which drives the head in rotation. An annular cavity 19 is hollowed out of the rear part of the head and communicates by orifices 20 with the internal part of the cylinder 12. The product to be sprayed comes by way of the channel 21 and by centrifugal force flows through the orifices 20 towards the disc 11 from which it is atomised in the electrostatic field. The head is energised with a high potential from the source V by way of the shaft 18.

The blades 13 produce a flow of surrounding fluid and help to ensure the outflow of the product to be atomised. The blades 14 produce a flow of surrounding fluid causing the above described effects to be produced.

It is possible to provide a separate nozzle 22, which may supply a suitable gas to the various blades 13 and 14.

Figure 2B:
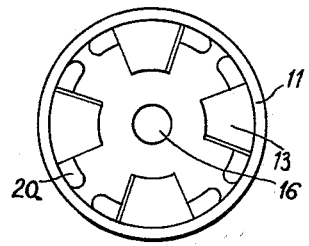
Figure 2C:
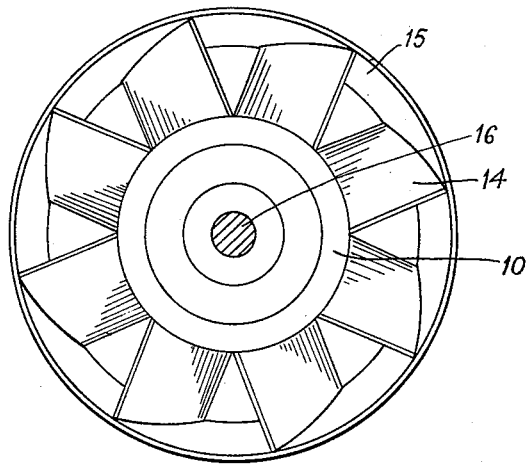
Figure 3A:
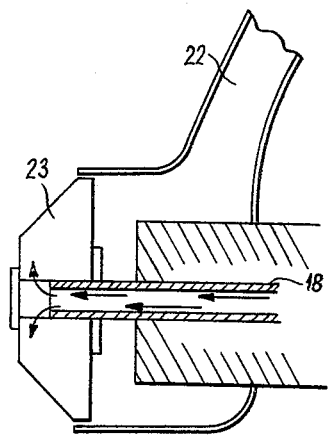
FIGURES 3a to 3f show various forms of a generally propeller shaped head.
Figure 3B:
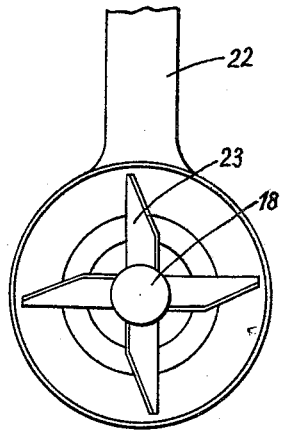
Figure 3C:
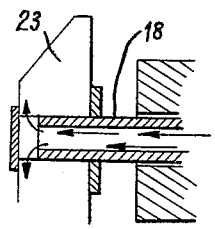
Figure 3D:
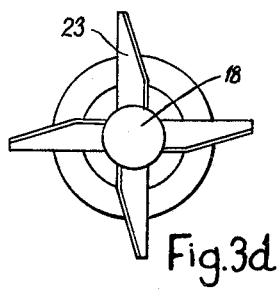
Figure 3E:
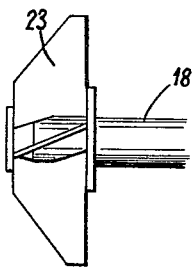
Figure 3F:
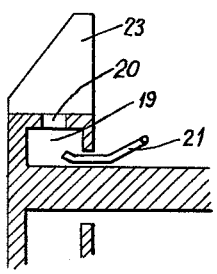

FIGURES 2 show a device similar to the previous one, but the atomising part 11 is cylindrical. The reference numerals of the parts are the same in both cases.

In both cases, the inlet of the substance to be atomised has been shown eccentric to the shaft 18. It is obvious that any other arrangement may be envisaged without going beyond the scope of the invention, for example there may be an axial inlet in the hollow shaft 18.

The inclination of the fins may be adjusted so as to be adapted to the substance which has to be dispersed (pulverulent viscous, very fluid, etc.).

It is also possible to envisage a head having the general shape of a cone, of a bowl etc., without departing from the scope of the present invention.

It is also possible to envisage a head having an atomising part which is no longer a solid of revolution but is in the form of vanes, helices, etc.

FIGURES 3 show various further modifications, in one of which (FIGURE 3f) the product to be sprayed or atomised is supplied to the blades or vanes 23 through an eccentric channel 21, a cavity 19 and orifices 20 as in FIGURES 1 and 2. In FIGURES 3a to 3e a product to be sprayed or atomised is fed through a central hollow shaft 18. These five latter figures show a head in its nozzle 22 (FIGURES 3a and 3b) or without a nozzle (FIGURES 3c, 3d and 3e). The substance to be sprayed then flows from the shaft 18 towards the blades 23 under the action of a centrifugal force. Preferably, the edge of the blades is thin, in order to obtain a strong electrostatic field in the zones where the substance is atomised in the surrounding fluid.

It should be noted that besides the above mentioned advantages it is possible to obtain drying effects for example which may be useful in painting, by choosing a suitable fluid in given conditions of temperature, pressure and composition and feeding this fluid into the nozzle 22.

Tests have been made with spraying and atomising apparatus constructed according to the present invention which not only have given the desired result of concentration of the particles but moreover have the advantage of improving the circulation of the atmosphere and of considerably reducing the amount of undesirable gases which may be found in the immediate vicinity of the operator.

I claim:

1. An electrostatic atomising and spraying device for coating an object with finely pulverised particles of coating material such as paint, said device comprising a rotatable spraying head, means for feeding the coating material to the head, means for feeding a high potential to said head, and a plurality of blades at least some of which are concentrically fixed on the internal surface of said head and a feed passage which is off-centre with respect to the axis of rotation of said head for feeding the material to be sprayed to said internal blades, and the positioning and orientation of said blades being such that they create a flow of surrounding air or gas along the mean direction of the spray of particles for concentrating them on the object to be covered.

2. An electrostatic atomising and spraying head comprising means forming an annular chamber, a plurality of outwardly projecting blades disposed round the outer surface of the chamber and arranged so that upon rotation of the head they create a flow of air or gas along the mean axial direction of the spray, a plurality of inwardly extending blades projecting from the inner surface of the chamber, an annular cavity in the rear face in the chamber, a plurality of orifices connecting the annular cavity with the interior of the chamber and means for feeding a material to be sprayed to the annular cavity.

3. A device as claimed in claim 2, including a supporting ring connecting the tips of the outwardly projecting blades.

4. An electrostatic atomising and spraying head comprising means forming an annular chamber, a plurality of outwardly projecting blades disposed round the outer surface of the chamber, a plurality of inwardly extending blades projecting from the inner surface of the chamber, an annular cavity in the rear face in the chamber, a plurality of orifices connecting the annular cavity with the interior of the chamber, means for securing the head to a rotatable shaft, means for feeding a material to be sprayed to the annular cavity, means for applying a potential to the device along the shaft and a nozzle member for supplying a gas to the blades.

5. A device as claimed in claim 4, in which the material to be sprayed is fed along a feed passage eccentric of the shaft.

References Cited in the file of this patent

UNITED STATES PATENTS

| | | |
|---|---|---|
| 1,759,629 | Riley | May 20, 1930 |
| 1,869,384 | MacLachlan | Aug. 2, 1932 |
| 2,163,474 | Sloan | June 20, 1939 |
| 2,555,271 | Jauch | May 29, 1951 |
| 2,899,136 | Reindl | Aug. 11, 1959 |
| 2,901,178 | Norris | Aug. 25, 1959 |
| 2,980,337 | Kozinski | Apr. 18, 1961 |

FOREIGN PATENTS

| | | |
|---|---|---|
| 495,199 | Great Britain | July 13, 1933 |